United States Patent
Goshen et al.

(10) Patent No.: US 8,212,716 B2
(45) Date of Patent: Jul. 3, 2012

(54) SYSTEM AND METHOD FOR CALIBRATION OF PHASED ARRAY ANTENNA HAVING INTEGRAL CALIBRATION NETWORK IN PRESENCE OF AN INTERFERING BODY

(75) Inventors: Elad Goshen, Beer-Sheva (IL); Yacov Vagman, Rishon LeZion (IL); Haim Reichman, Mazkeret Batia (IL)

(73) Assignee: Elta Systems Ltd., Ashdod (IL)

( * ) Notice: Subject to any disclaimer, the term of this patent is extended or adjusted under 35 U.S.C. 154(b) by 0 days.

(21) Appl. No.: 12/851,148

(22) Filed: Aug. 5, 2010

(65) Prior Publication Data
US 2011/0133982 A1 Jun. 9, 2011

Related U.S. Application Data

(63) Continuation-in-part of application No. 12/824,976, filed on Jun. 28, 2010, now Pat. No. 8,013,783, which is a continuation of application No. PCT/IL2008/001661, filed on Dec. 24, 2008.

(30) Foreign Application Priority Data

Dec. 31, 2007 (IL) .......................................... 188507

(51) Int. Cl.
*G01S 7/40* (2006.01)
(52) U.S. Cl. ........................................ 342/169; 342/165
(58) Field of Classification Search ........... 342/165–174
See application file for complete search history.

(56) References Cited

U.S. PATENT DOCUMENTS

| | | |
|---|---|---|
| 4,517,570 A | 5/1985 | Gray, Jr. |
| 4,994,813 A | 2/1991 | Shiramatsu et al. |
| 5,412,414 A | 5/1995 | Ast et al. |

(Continued)

FOREIGN PATENT DOCUMENTS
EP 1-126-544 A2 8/2001
(Continued)

OTHER PUBLICATIONS

Ruth Rotman, et al., Calibration of Large Phased Arrays Including Monopulse Ratios, 2001, pp. 622-625, IEEE.

*Primary Examiner* — Timothy A Brainard
(74) *Attorney, Agent, or Firm* — Oliff & Berridge, PLC

(57) ABSTRACT

A method for calibrating an antenna comprising a phased array of antenna elements connected to a plurality of transceivers, the method comprising providing an RF source located close to the antenna and synchronized with the transceivers, determining, per antenna element, a calibration ratio adapted to accommodate for presence of at least one interfering structure electromagnetically interfering with a signal transmitted from the RF source and received by the antenna, wherein the determining includes generating simulated far field and near field signals so as to simulate a signal transmitted by an RF source located at infinity and located near the RF source respectively, internally injecting an internal signal into the antenna via an internal injection network, using the RF source to externally inject an external signal into the antenna; and, for each individual antenna element, computing said calibration ratio by combining information characterizing the internal and external signals as received by the individual antenna element with a correction factor characterizing the simulated far field and near field signals; and calibrating the antenna using the per-antenna element calibration ratios adapted to accommodate for presence of at least one interfering structure.

26 Claims, 12 Drawing Sheets

U.S. PATENT DOCUMENTS

| | | |
|---|---|---|
| 5,559,519 A | 9/1996 | Fenner |
| 6,046,697 A * | 4/2000 | Overbury et al. ............. 342/360 |
| 6,084,545 A | 7/2000 | Lier et al. |
| 6,480,153 B1 | 11/2002 | Jung et al. |
| 6,531,989 B1 | 3/2003 | Barker et al. |
| 7,068,218 B2 | 6/2006 | Göttl et al. |
| 7,119,739 B1 | 10/2006 | Struckman |
| 2002/0067310 A1* | 6/2002 | Pietrusiak ..................... 342/368 |
| 2002/0171583 A1* | 11/2002 | Purdy et al. .................. 342/368 |
| 2003/0038747 A1 | 2/2003 | Patel et al. |
| 2003/0058166 A1* | 3/2003 | Hirabe ......................... 342/368 |
| 2004/0061644 A1 | 4/2004 | Lier et al. |

FOREIGN PATENT DOCUMENTS

| | | |
|---|---|---|
| EP | 1-294-047 A2 | 3/2003 |
| EP | 1-329-983 A2 | 7/2003 |
| WO | WO 2009/083961 A1 | 7/2009 |

* cited by examiner

SYSTEM AND METHOD FOR CALIBRATION OF PHASED ARRAY ANTENNA HAVING INTEGRAL CALIBRATION NETWORK IN PRESENCE OF AN INTERFERING BODY

RELATED APPLICATIONS

This application is a continuation-in-part of a co-pending U.S. application Ser. No. 12/824,976, filed on Jun. 28, 2010, which in turn is a continuation application of PCT/IL2008/001661, filed on Dec. 24, 2008, which, in turn, claims priority to Israeli Patent Application No. 188507, filed on Dec. 31, 2007.

FIELD OF INVENTION

The present invention relates to phased array antennas, generally and in particular, to calibration thereof.

BACKGROUND OF INVENTION

The antenna of an active phased array system must be able to steer its beam so that the system can obtain information about the surroundings in different directions. It is also desirable that the antenna suppress signals from other directions than the direction in which the system is currently transmitting and receiving. A phased array antenna comprises a number of transmitting/receiving elements, usually arranged in a planar configuration. Each element, or group of elements, is driven by a transmit/receive (T/R) module which controls the phase and the amplitude of the corresponding antenna element.

On transmission of a signal from a phased array antenna, the signal is divided into a number of sub-signals, and each sub-signal is fed to one of the modules. The modules comprise signal channels guiding the sub-signals to the antenna elements. Each signal channel comprises controllable attenuators or amplifiers and controllable phase-shifting devices for controlling the amplification and the phase shift of the modules. The signals transmitted through the antenna elements interfere with each other. By selecting suitable values of the relative amplification and the relative phase-shifting between the modules and by utilizing the interference of the transmitted signals, the directional sensitivity of the antenna can be controlled.

During reception in a phased array antenna, the opposite procedure takes place compared to transmission. Each antenna element receives a sub-signal. The modules comprise signal channels for reception and through these signal channels the sub-signals are collected in a single point in which all sub-signals are added to form a single composite signal. The signal channels for reception also comprise amplifiers and phase shifters, and the directional sensitivity of the antenna for reception can be controlled in a corresponding way as for transmission, by varying the amplification and phase-shifting of the modules.

In order to obtain the desired directional properties of the antenna, it is desired to minimize the side lobe levels of the antenna. To enable low side lobe levels with an electrically controlled phased array antenna, high accuracy of the amplification and the phase shift in the modules is required. In practice, this is achieved by introducing a calibration function in the antenna system. Central to the calibration concept is the compensation of the various contributions of cables, attenuators, phase shifters, regulators and other parts in the transmit/receive channels which respond differently at different temperatures, for each antenna element and at each radio frequency. The calibration procedure is required to determine what controls should be applied to the transmit/receive modules in order to obtain the desired current distribution on the antenna aperture.

Phased array antenna architectures typically include a calibration network, whose purpose is to provide injection of a predetermined calibration signal to each antenna element and to the T/R module connected to it. An example of this type of calibration network is described in U.S. Pat. No. 7,068,218 to Göttl et al. Göttl et al's calibration procedure utilizes, in addition to the operational transmit/receive channels, also an auxiliary injection network, whose contribution must be known in advance. This is determined using the concept of the calibration ratio, which measures the ratio between signals injected externally (in principle from infinity) to those injected internally.

Much prior art relates to phased antenna calibration and the determination of calibration ratio. Of the many different approaches that are known in the art, all presently fall into one of two categories. Some methods use an external calibration signal that is disposed at infinity so that the respective amplitudes and phases of the external calibration signals injected into each antenna element are the same. This, of course, greatly simplifies the determination of calibration ratio, but is not feasible when there is insufficient space between the external calibration source and the phased array antenna, such as when a phased array antenna is recalibrated in the field.

The other approach disposes the external calibration source proximate to each antenna element in turn, while ensuring that the distance from the external calibration source to each antenna element is the same and that the external calibration source is exactly aligned to the optical center of each antenna element. This also ensures that the respective amplitudes and phases of the external calibration signals injected into each antenna element are the same, but requires critical and consequently complex alignment and is both time-consuming and expensive.

When the calibration reference signal is derived from a distant source such as a satellite, the signal emanates from infinity so that its wavefront is effectively equidistant from all the antenna elements. It therefore arrives in the same phase at all the antenna elements. But it is not always practical to use a distant source for the calibration source, particularly when space is at a premium as is often the case in field calibration. In satellite applications, for example, the required band of frequencies is not guaranteed and even if the required band of frequencies is provided—the signal may not reach the desired intensity. Prior art approaches that employ so-called near zone calibration are known to feed a planar calibration signal successively to the antenna elements.

For example, U.S. Pat. No. 6,084,545 (Lier et al.) discloses a near-zone calibration arrangement for a phased-array antenna that determines the phase shifts or attenuation of the elemental control elements of the array. The calibration system includes a probe located in the near zone, and a calibration tone generator. According to the concept of reciprocity, the near zone calibration procedure can be applied to transmit or receive modes as well. In case of receive calibration mode, a probe sequentially moves from one antenna element to another, keeping the same electro-magnetic coupling conditions (distance from antenna plane, polarization, orientation etc.) and transmitting the same test signal. A receive antenna array has a switching arrangement, providing appropriate RF-module/antenna element connection to the measurement unit via controllable phase shifter/attenuator. The near-zone calibration goal achieves the same signal parameters (phase and amplitude) coming from each RF-module (and appropriate probe locations) by applying control signals to the appropriate phase shifters and attenuators.

Regardless of whether near zone or far field calibration is performed, when a calibration network is factory-calibrated, sets of calibration values must be pre-assigned to each antenna. These values cannot be determined in the field and are apt to be inapplicable to a replacement antenna element, so that if an antenna element is replaced in the field, such an approach is fraught with difficulty.

In summary, far zone calibration allows the calibration signal to be fed simultaneously to all the antenna elements from a common source and ensures that it will arrive at the same phase at all the antenna elements; but is not suitable for use in confined spaces, such as when re-calibrating antenna elements in the field. On the other hand, near zone calibration requires that in order for the external calibration signal to arrive at the same phase at all the antenna elements, it must be fed to each antenna element sequentially and this requires precise alignment which is time-consuming and expensive.

The methods for calibration ratio acquisition described above, are costly and inaccurate in those cases where the antenna cannot be assumed to be bare i.e. where the antenna is electromagnetically coupled to an interfering structure. The accurate calibration ratio should take into account electro-magnetic coupling to all near-by interfering structures. Even if an interfering structure is absent at some point in time, this may be no longer true when the antenna is deployed later in some other place where the assumption of a bare antenna no longer holds. One example is a phased array cellular antenna located in some urban environment where some physical obstacles interfere with the antenna. Even worse, these obstacles might not have been present at the time of antenna installation. Another example is an antenna mounted on aircraft, or on a tank or ship. In this case an aircraft wing may interfere with an antenna mounted on the fuselage of the aircraft. By the same token masts on a marine vessel may also interfere with antennas installed on it. There is a plethora of examples where such interference might be significant.

U.S. Pat. No. 7,119,739 to Struckman describes a method for near field to far field DF antenna array calibration.

The disclosures of all publications and patent documents mentioned in the specification, and of the publications and patent documents cited therein directly or indirectly, are hereby incorporated by reference.

SUMMARY OF INVENTION

Certain embodiments of the present invention seek to provide calibration of phased array antennas, electro-magnetically coupled, to some external structure which distorts the electromagnetic properties of the bare antenna.

Certain embodiments of the present invention seek to provide computation of calibration ratio of an antenna in the presence of an interfering body.

Certain embodiments of the present invention seek to provide computation of calibration ratio in the presence of the combined effect of the interfering body and the correction for the spherical wave front from the point RF source.

Certain embodiments of the present invention seek to provide computation of corrections for calibration ratio measured using external measurement without an interfering body for the presence of an interfering body.

Certain embodiments of the present invention seek to provide correction of calibration ratio obtained by measurements performed under the conditions of near/intermediate electro-magnetic field using RF simulation methods.

Certain embodiments of the present invention seek to provide using simulation to estimate the electro-magnetic coupling between antenna of interest and an interfering body located in a close vicinity to that antenna under various conditions of antenna illumination by an external point RF source.

Certain embodiments of the present invention seek to provide use of simulation to estimate the range dependence of magnitude and phase of this electro-magnetic coupling as a function of difference in contribution of electro-magnetic coupling of an interfering body to the externally injected signals at various distances of the external point RF source.

Certain embodiments of the present invention seek to provide computation of calibration ratio of an antenna using RF source, which is not necessarily a point source or a source with a well defined phase center.

Certain embodiments of the present invention seek to provide computation of calibration ratio of an antenna in presence of an interfering body using RF source, which is not necessarily a point source or a source with a well defined phase center.

The system shown and described herein uses a modified calibration ratio which takes into account the existence of the interfering structure in the vicinity of the antenna itself. The modified calibration ratio is defined as a ratio of a signal injected from infinity in the presence of the interfering structure (aircraft for example) and an internally injected signal also in presence of that interfering structure. The boundary between the two regions is defined as a function of the application, and depends on the dominant wavelength emitted by the source.

"Infinity" is taken to mean that the far zone conditions—regarding the point source and the combined structure of the antenna and the interfering body—are met, namely that:

$$r > \frac{(2 \div 3)D^2}{\lambda} \quad (1)$$

Where:
  r is the distance from the external RF-source to the combined structure of the antenna and the interfering body,
  D is the maximum of:
    1. The combined structure of the antenna and the interfering body size; and
    2. The size of external RF-source aperture,
  $\lambda$ is the wavelength of the RF-radiation.

It is appreciated that in aircraft-mounted antenna applications, e.g. as illustrated in FIG. 5, the far zone condition of the antenna electro-magnetically coupled to the wing structure may result in a distance r which exceeds 10 kilometers.

Certain embodiments of the present invention seek to provide calibration ratio acquisition in field conditions using an inexpensive facility where the anechoic chamber as a means of a near zone range is no longer an option and at the same time a satellite as a means of a far zone range is also impossible.

Certain embodiments of the present invention seek to provide a method for estimation of the calibration ratio utilizing a system including an RF point source located close to the antenna and synchronized with the transceiver connected to the antenna. A signal transmitted from this point source is received by the antenna and corrected by a simulation as if it were transmitted by this point source at infinity. An additional signal is injected using the auxiliary network. The ratio between the two signals, for each antenna element, is the required calibration ratio.

Certain embodiments of the present invention seek to provide calibration ratio determination and calibration which occurs on the ground, followed by an operational stage which is airborne. The calibration ratio takes into account electromagnetic coupling between at least one physical object fixed to the ground and the RF source; the physical object may in fact be the ground itself.

There is thus provided, in accordance with at least one embodiment of the present invention, a system for calibration of a phased array antenna having a network of auxiliary channels internally injecting internal signals to the antenna, to be used in an environment including at least one interfering member affecting a calibration ratio of the antenna, the antenna comprising a plurality of mutually electro-magnetically coupled antenna elements, the system comprising an RF source external to the antenna, disposed a near-by distance therefrom and operative to project external signals toward the antenna from the nearby distance, an RF simulation unit operative to generate simulated first electro-magnetic coupling-zero far-zone external fields projected toward the antenna from an RF source located at a far-zone distance from the antenna, assuming that first electro-magnetic coupling between the mutually electro-magnetically coupled antenna elements to be zero, and also operative to generate simulated first electro-magnetic coupling-zero near zone external fields projected toward the antenna from an RF source located at the nearby distance from the antenna were the first electro-magnetic coupling between the mutually electro-magnetically coupled antenna elements to be zero; and an electro-magnetically coupled structure-accommodating calibration ratio computer operative to compute a Modified Calibration ratio by combining an indication of the internal signals and the external signals as received by the antenna, with a correction factor based on an output of the RF simulation unit.

Further in accordance with at least one embodiment of the present invention, the RF source comprises an RF point source.

Still further in accordance with at least one embodiment of the present invention, the RF source may be spherical or may alternatively be non-spherical.

Further in accordance with at least one embodiment of the present invention, the antenna calibrator is operative to combine the calibration ratio and the correction factor by adding the phases of the calibration ratio and the correction factor to obtain a phase value of the Modified Calibration ratio and adding decibel representations of the amplitudes of the calibration ratio and the correction factor to obtain a decibel representation of an amplitude of the Modified Calibration ratio.

Additionally in accordance with at least one embodiment of the present invention, the RF simulation tool computes the correction factor by computing electromagnetic fields generated in and propagating within a non-continuous medium.

Further in accordance with at least one embodiment of the present invention, the antenna comprises a cellular antenna.

Still further in accordance with at least one embodiment of the present invention, the system also comprises a platform upon which the antenna is mounted and wherein the interfering member is part of the platform.

Further in accordance with at least one embodiment of the present invention, the signal measurement and recording device measures amplitude and phase of the samples of the internal and external signals.

Also provided, in accordance with at least one embodiment of the present invention, is a method for calibrating an antenna comprising a phased array of antenna elements connected to plurality of transceivers, the method comprising providing an RF source of externally injected signals located close to the antenna and synchronized with the transceivers; determining, per antenna element, a calibration ratio adapted to accommodate for presence of at least one interfering structure electromagnetically interfering with a signal transmitted from the RF source and received by the antenna; and calibrating the antenna using the per-antenna element calibration ratios adapted to accommodate for presence of at least one interfering structure.

Further in accordance with at least one embodiment of the present invention, the determining includes generating simulated far field and near field signals so as to simulate a signal transmitted by an RF source located at infinity and located near the RF source respectively; internally injecting an internal signal into the antenna via an internal injection network synchronized with the transceivers, wherein the interfering structure interferes with the internal signal; using the RF source to externally inject an external signal into the antenna; and, for each individual antenna element. Computing the calibration ratio by combining information characterizing the internal and external signals as received by the individual antenna element with a correction factor characterizing the simulated far field and near field signals and representing, per antenna element, the ratio of the simulated far field and near field signals.

Still further in accordance with at least one embodiment of the present invention, at least one physical object which is electromagnetically coupled to radiation emitted by the RF source thereby to define unwanted radiation in context of the calibration, is present in the course of the determining and calibrating and is absent in a subsequent operational stage, the method also comprising screening the unwanted radiation.

Further in accordance with at least one embodiment of the present invention, the screening comprises covering the at least one physical object with RF-radiation absorbing material.

Still further in accordance with at least one embodiment of the present invention, the determining and calibrating occurs on the ground, the operational stage is airborne and the physical object is fixed to the ground.

Still further in accordance with at least one embodiment of the present invention, the determining comprises determining the calibration ratio a plurality of times thereby to obtain a plurality of interim calibration ratio results and averaging the plurality of interim calibration ratio results to obtain the calibration ratio adapted to accommodate for presence of at least one interfering structure.

Additionally in accordance with at least one embodiment of the present invention, the determining the calibration ratio a plurality of times includes re-positioning the RF source a plurality of times, thereby to compensate for artifactual noise generated by the at least one interfering structure during calibration ratio measurement.

Further in accordance with at least one embodiment of the present invention, the calibration ratio is determined a plurality of times for a single position of the RF source, thereby to compensate for white noise during calibration ratio measurement.

Additionally in accordance with at least one embodiment of the present invention, the correction factor includes a phase and an amplitude and wherein the at least one interfering structure comprises a plurality of interfering structures and wherein generating at least one simulated signal comprises performing the following operations for a near field configuration and for a far field configuration: a. computing a plurality of simulated first electromagnetic fields generated at the plurality of interfering structures respectively due to radiation emitted by the RF source; b. computing a plurality of simulated induced currents generated at the plurality of interfering structures respectively due to radiation emitted by the RF source; c. for each antenna element in the phased array of antenna elements: 1. simulating a second electromagnetic field generated at the antenna element due to radiation emitted by the RF source; 2. computing a plurality of simulated third electromagnetic fields generated at the antenna element due to the plurality of simulated induced currents respectively; and 3. generating a total field by summing the plurality of simulated third electromagnetic fields and the second electromagnetic field; d. for each antenna element in the phased array of antenna elements: 1. computing a correction factor by computing a ratio of the total field as computed for the far field configuration divided by the total field as computed for the near field configuration; and 2. computing the phase and amplitude of the calibration ratio by measuring phase and amplitude for each of the internal and external signals as received by each of the antenna elements; and e. for each individual antenna element, computing the calibration ratio adapted to accommodate for presence of at least one interfering structure by computing a difference between the phases of the external and internal signals as received by the individual antenna element, and adding the phase of the correction factor.

Further in accordance with at least one embodiment of the present invention, the antenna is installed on an aircraft and the plurality of interfering structures include a fuselage, a first wing, a second wing, an engine, a stabilizer and a rudder.

Still further in accordance with at least one embodiment of the present invention, the antenna is installed on a ship and the plurality of interfering structures include a hull, at least one mast and a bridge.

Additionally in accordance with at least one embodiment of the present invention, the antenna is installed on a tank and the plurality of interfering structures include a hull, a turret and a cannon.

Also provided, in accordance with at least one embodiment of the present invention, is a computer program product, comprising a computer usable medium having a computer readable program code embodied therein, the computer readable program code adapted to be executed to implement a method for calibrating an antenna comprising a phased array of antenna elements connected to plurality of transceivers, the method comprising providing an RF source located close to the antenna and synchronized with the transceivers; determining, per antenna element, a calibration ratio adapted to accommodate for presence of at least one interfering structure electromagnetically interfering with a signal transmitted from an RF source, which is located close to the antenna and synchronized with the transceivers, the signal being received by the antenna, wherein the determining includes generating simulated far field and near field signals so as to simulate a signal transmitted by an RF source located at infinity and located near the RF source respectively; internally injecting an internal signal into the antenna via an internal injection network; using the RF source to externally inject an external signal into the antenna; and for each individual antenna element, computing the calibration ratio by combining information characterizing the internal and external signals as received by the individual antenna element with a correction factor characterizing the simulated far field and near field signals; and calibrating the antenna using the per-antenna element calibration ratios adapted to accommodate for presence of at least one interfering structure.

Further in accordance with at least one embodiment of the present invention, the method is carried out in field conditions in which no anechoic chamber is available.

Still further in accordance with at least one embodiment of the present invention, the external signals are affected by first electro-magnetic coupling between the plurality of mutually electro-magnetically coupled antenna elements and by second electro-magnetic coupling between the source and the interfering member, the system also comprising a signal measuring and recording device measuring and recording samples of the internal signals and the external signals; and a correction factor computation unit operative to compute a correction factor for the calibration ratio which factor corrects for presence of the interfering member and has a phase and an amplitude, by comparing the simulated first electro-magnetic coupling-zero far-zone external electromagnetic fields and the simulated first electro-magnetic coupling-zero near zone external electromagnetic fields, and the electro-magnetically coupled structure-accommodating calibration ratio computer is operative to compute the modified Calibration ratio by combining the ratio of the internal and external signals as received by the antenna with the correction factor.

Further in accordance with at least one embodiment of the present invention, the method also comprises computing (in dB) a difference between the amplitudes of the external and internal signals as received by the individual antenna element, and adding the amplitude (in DB) of the correction factor.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings.

DETAILED DESCRIPTION OF THE EMBODIMENTS

Certain embodiments of the present invention are suited for applications in which the same electromagnetic environment exists during the phase of measuring the calibration ratio as also during the calibration phase itself and likewise during the operational phase such that any deviation from this assumption may be assumed to be negligible or otherwise reduced until negligible. According to certain embodiments of the invention, a modified calibration ratio is employed which represents effects of the interfering bodies which are near to the antenna of interest, since simply measuring the calibration ratio of a bare antenna knowing that its operational environment includes obstacles such as parts of a ship, plane or tank, is not sufficient. The calibration ratio is determined by a ratio of two measurements: an internal injected signal $IN^0$ via the injection unit 33 and an external injected signal using a point RF source. For the external injection, a RF source is deployed close to the antenna, correction is made for large distances including simulating the difference in electromagnetic coupling between these distances. This simulation computes the propagation of electromagnetic radiation through a discontinuous dielectric medium. The discontinuity involved here represents an interfering body 41 located at close proximity to the antenna. Other discontinuities which are present during calibration ratio acquisition but absent in the operational stage, such as ground causing multi-path effects, may be overcome e.g. by covering the relevant interfering elements with RF-radiation absorbing material or by other methods.

The modified calibration ratio is used for antenna calibration as is known in the art. An example use of a calibration ratio as computed herein, to calibrate an antenna is described in U.S. Pat. No. 6,480,153 to Jung. Jung terms the calibration ratio "transfer function".

Figure 1:
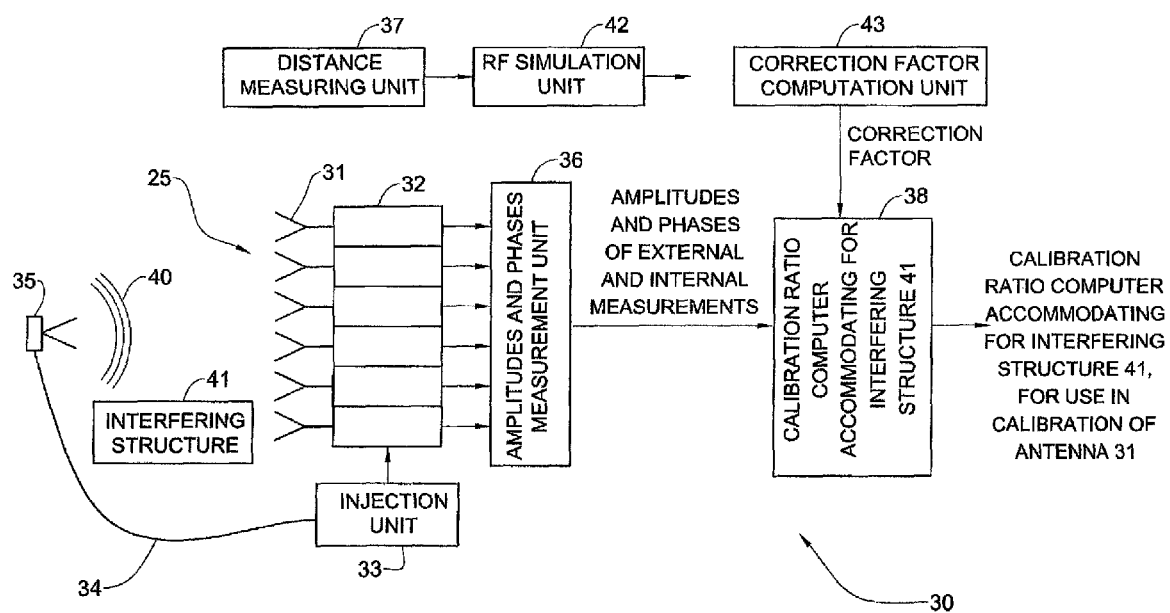
FIG. 1 is a simplified functional block diagram illustration of a phased array antenna calibration system using a point RF-source for computing a calibration ratio according to an embodiment of the invention.

FIG. 1 shows a phase array antenna arrangement that includes a bare array 25 of antenna elements 31 to be calibrated which are respectively connected to a plurality of transceivers 32 operative to control signals transmitted or received through the antenna, an internal injection unit 33, (also termed herein "auxiliary channel network 33") for injecting calibrating signals into the antenna elements 31, an RF source 35 such as a point RF-source, and an amplitude and phase measurement unit 36, also termed herein "signal measuring and recording device 36".

Signals received by the transceivers 32 are measured by the amplitude and phase measurement unit 36. This process includes down conversion, filtering and generation of in phase and quadrature sampled signals which are converted to phases and amplitudes in a fashion known to any person skilled in this field. The corresponding phases and amplitudes are stored in a suitable memory device and processed, as described below with reference to steps 230 and 250 in FIG. 4A, by a electro-magnetically coupled structure-accommodating calibration ratio computer 38.

Distance measurement unit 37 is operative to measure the physical distance of the RF point source from the antenna using, e.g. a laser gun or any other suitable means. The distance between point RF source 35 and the antenna 31 as measured by the distance measuring unit 37 is used by an RF simulation tool 42, as described below with reference to FIG. 4A, step 250, to generate a simulated signal which simulates an externally injected signal. Electro-magnetically coupled structure-accommodating calibration ratio computer 38 is a calibration ratio computer which accommodates for interfering structure 41. Unit 38 computes the accommodating calibration ratio by combining the measurements of the internal and external injections generated by distance measuring unit 37, with the correction factor computed by unit 43, all as described herein.

An interfering body 41 is typically disposed in close proximity to the antenna 31 and to the RF source used for external injections 35. An RF simulation tool 42 is also provided which solves Maxwell equations to compute the electromagnetic fields which propagate through discontinuous media, obeying specific boundary conditions. The RF simulation tool 42 may for example comprise a general purpose computer running RF simulation software such as but not limited to FEKO Suite software, a product of EM Software & systems-S. A. Ltd.; Computer Simulation Technology Studio Suite software, a product of CST GmbH; GRASP software, a product of TICRA Engineering Consultants; WIPL-D Pro software tool, a product of WIPL-D d.o.o.; or COMSOL MultiPhysics, a product of Comsol Group. A correction factor computation unit 43 computes a correction factor as described below, e.g. using formulae 8-14 described below, and may comprise a suitably programmed computer.

It is appreciated that interfering body 41 as referred to herein is typically one which is present both when the calibration ratio is being established and during operation of the antenna. Members which interfere, but are not present during operation of the antenna are typically covered by RF-radiation-absorbing materials selected to match the operating frequency of the antenna, as described below with reference to step 215 in FIG. 4A, hence can almost be assumed not to exist or not to be present, for practical purposes, although the methods of FIGS. 9-10 below are particularly suited to applications in which it is desired to overcome even minor residual effects caused by covered interfering members despite their being covered. Commercially available RF absorption materials are distributed for example by ORBIT/FR Inc. as described at their website orbitfr.com, and by TDK RF Solutions Inc. as described at their website TDKRFSolutions.com.

Thus the apparatus of FIG. 1 includes two sources of RF-signals: the first is the internal injection unit 33 that is electromagnetically coupled to antenna elements 31 and to the transceivers 32, while the second is the point (typically) RF-source 35 from which a spherical wave 40 emanates toward the plurality of the antenna elements 31. Comparison of measurement results of these two signals enables derivation (FIG. 4C, step 370) of what is termed the "phase component" of the calibration ratio attributed to the plurality of antenna elements, with the effect of interfering body 41 suitably neutralized according to certain embodiments of the present invention.

The system of FIG. 1 generates an interfering-structure accommodating calibration ratio which can be used to calibrate phased array antenna 31. The RF source 35 external to the antenna, is disposed a near-by distance therefrom and is operative to project external signals toward the antenna 31 from the near-by distance, the external signals being affected by first electro-magnetic coupling between the plurality of mutually electro-magnetically coupled antenna elements 31 and by second electro-magnetic coupling between the point source 35 and the interfering member 31. Signal measuring and recording device 36 is operative for measuring and recording samples of the internal signals and the external signals.

Figure 5:
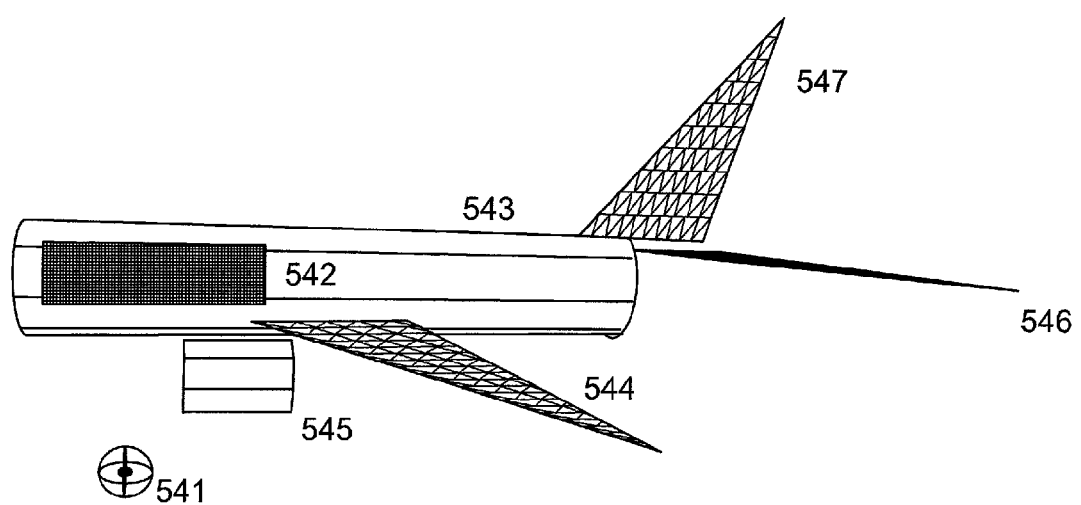
FIG. 5 is a simplified pictorial illustration of conformal antenna, installed on a platform comprising an aircraft, only the main electro-magnetically coupled structures of which are shown, which antenna is to be calibrated according to an embodiment of the invention.
Figure 6:
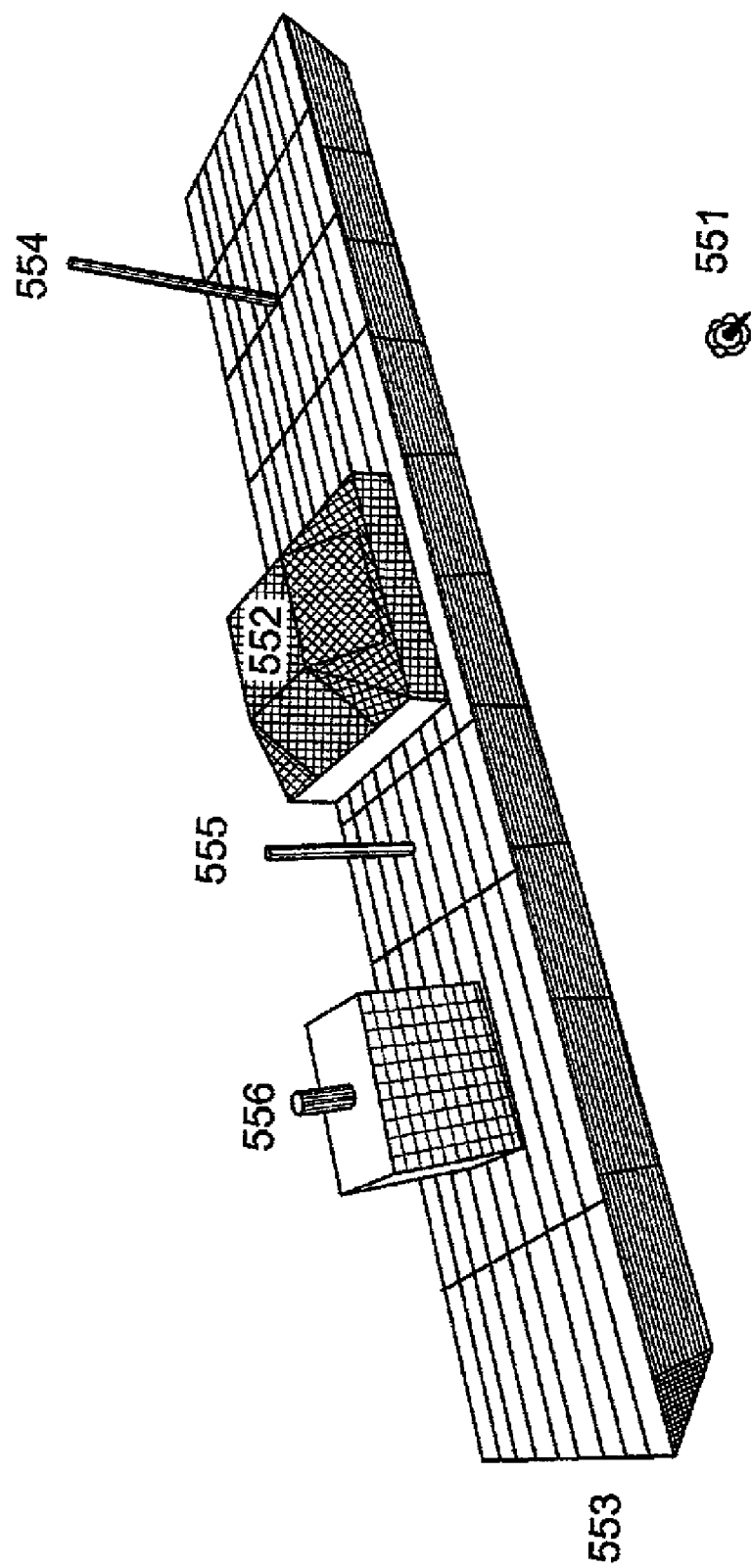
FIG. 6 is a simplified pictorial illustration of array of antennas, installed on a platform comprising a boat, only the main electro-magnetically coupled structures of which are shown, which array is to be calibrated according to an embodiment of the invention.
Figure 7:
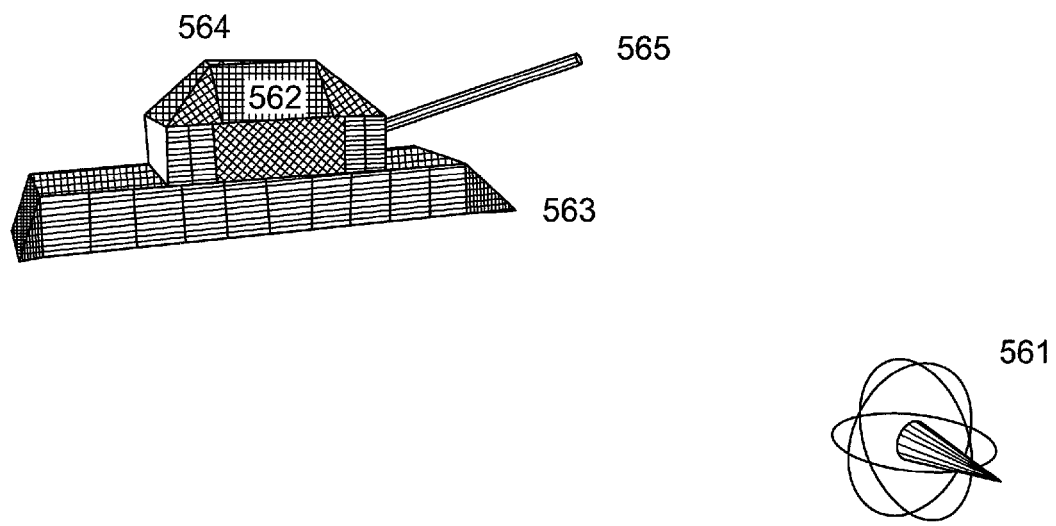
FIG. 7 is a simplified pictorial illustration of an antenna, installed on a platform comprising a tank, only the main electro-magnetically coupled structures of which are shown, which antenna is to be calibrated according to an embodiment of the invention.

RF simulation unit 42 is operative to generate simulated first electro-magnetic coupling-zero far-zone external fields projected toward the antenna from an RF point source located at a far-zone distance from the antenna, assuming that first electro-magnetic coupling between the mutually electro-magnetically coupled antenna elements to be zero, and is also operative to generate simulated first electro-magnetic coupling-zero near zone external fields projected toward the antenna from an RF point source located at the near-by distance from the antenna were the first electro-magnetic coupling between the mutually electro-magnetically coupled antenna elements to be zero. Specifically, RF simulation tool 42 may be used for computations of the total effect of the interfering body 41 and the correction for the spherical wave front 40 from the point RF source 35 due to electro-magnetic coupling between the point RF source 35 and the platform supporting the antenna, e.g. as shown in FIGS. 5-7, and due to correction for the spherical wave front 40 from the point RF source. Tool 42 may be in use for the computations of corrections for the calibration ratio to fulfill far zone conditions of the combined structure of antenna together with the interfering body 41.

Correction factor computation unit 43 computes a correction factor, having a phase and an amplitude, for the calibration ratio due to presence of the interfering member by comparing the simulated first electro-magnetic coupling-zero far-zone external electromagnetic fields and the simulated first electro-magnetic coupling-zero near zone external electro-magnetic fields. Electro-magnetically coupled structure-accommodating calibration ratio computer 38 is operative to compute a Modified Calibration ratio by combining the ratio of the external measurement and the internal measurement and correction factor.

Figure 2:
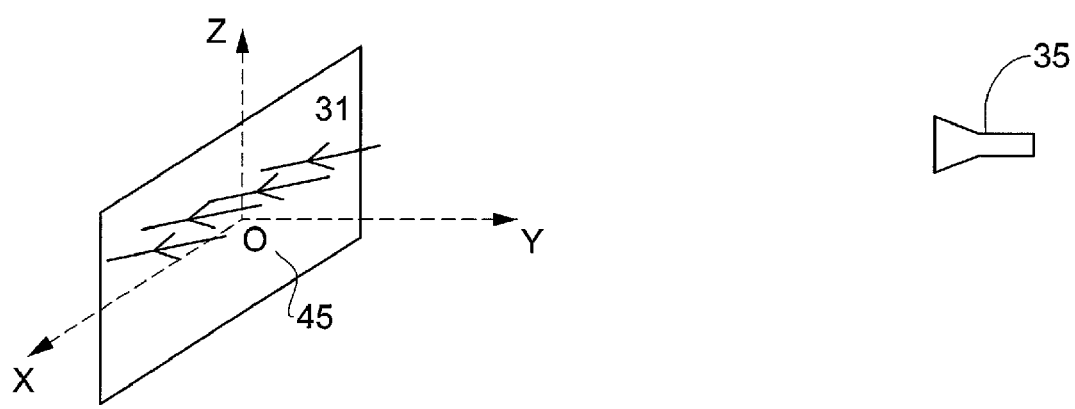
FIG. 2 is a pictorial diagram of the measurement setup without an interfering body (bare antenna), showing the spatial arrangement of the point RF source and the antenna elements plane.

FIG. 2 shows a suitable spatial arrangement of the point RF source 35 and the bare antenna, i.e. the phased array antenna of FIG. 1, comprised of the antenna elements 31, without an interfering body e.g. structure 41 of FIG. 1 (bare antenna). The origin of the antenna array is marked as O.

Figure 3:
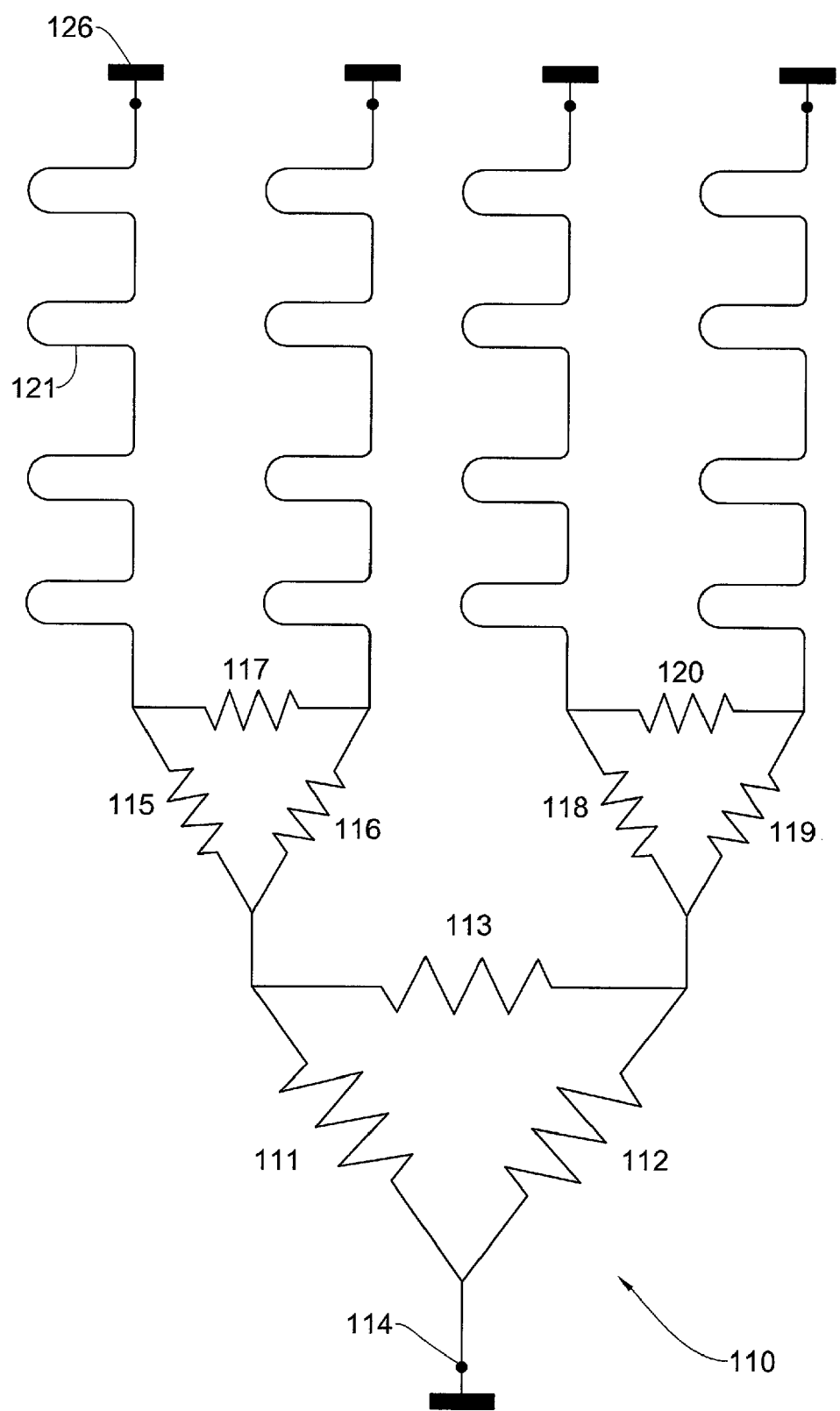
FIG. 3 is a simplified electronic schematic diagram of a calibration signal injection network which may serve as the injection unit of FIG. 1 according to one embodiment of the present invention.

FIG. 3 is a simplified electronic schematic diagram of a calibration signal injection network 110 which may serve as the injection unit of FIG. 1 according to one embodiment of the present invention. As shown, calibration signal injection network 110 includes a triad of dividers 111, 112 and 113 interconnected so that a common junction of the dividers 111 and 112 serves as a corporate feed point 114 for injecting an input signal into the network. Respective junctions between opposite ends of the divider 113 and respective ends of the dividers 111 and 112 are connected to similar divider triads comprising dividers 115, 116, 117 and 118, 119, 120. Thus, the dividers 115 and 116 are commonly connected at a first end to one end of the divider 113 whose other end is commonly connected to a first end of the dividers 118 and 119. The second ends of the dividers 115, 116, 118 and 119 are connected to respective couplers 121 each of which is terminated by a respective termination 126. The input signal is split initially at the junction between the dividers 111 and 112 and is again split at each of the respective junctions between dividers 115, 116 and 118, 119. Depending on the values of the dividers, different currents will flow through each of the couplers 121.

The calibration signal injection network 110 is interposed between the array of antenna elements 31 to be calibrated, such that when a single input signal is fed to the corporate feed point 114 of the calibration network 110, respective steering signals are fed to each of the antenna elements 31 via respective conventional phase shifters and amplifiers (not shown) that are inductively coupled to the current loops 121. The values of the steering signals fed to each antenna element 31 are predetermined by the values of the dividers in the calibration network 110 and are thus known in advance.

When an antenna array is calibrated using the calibration signal injection network 110, an input signal is fed to the corporate feed point 114 and the output signals flowing through each antenna element 31 are measured. Any offset in amplitude or phase from a respective desired value is measured and the corresponding amplitude and phase offsets are determined.

In conventional use of such a calibration signal injection network, precise adjustment is required to ensure that the signals fed via the couplers 121 to the antenna element are identical in amplitude and phase. Not only does this require precise calibration. It also means that if values of the components of the calibration signal injection network change for any reason, e.g. owing to changes in ambient temperature that may induce changes to the lengths of connectors, such changes must be compensated for in prior art systems. This, conventional systems necessitate provision of costly circuitry operative to ensure that the calibration signal injection network shown therein may be functional according to conventional calibration procedures. Such circuitry is not required, according to certain embodiments of the present invention, and this greatly reduces the complexity of a phased array antenna arrangement having such an integral calibration signal injection network.

Figure 4A:
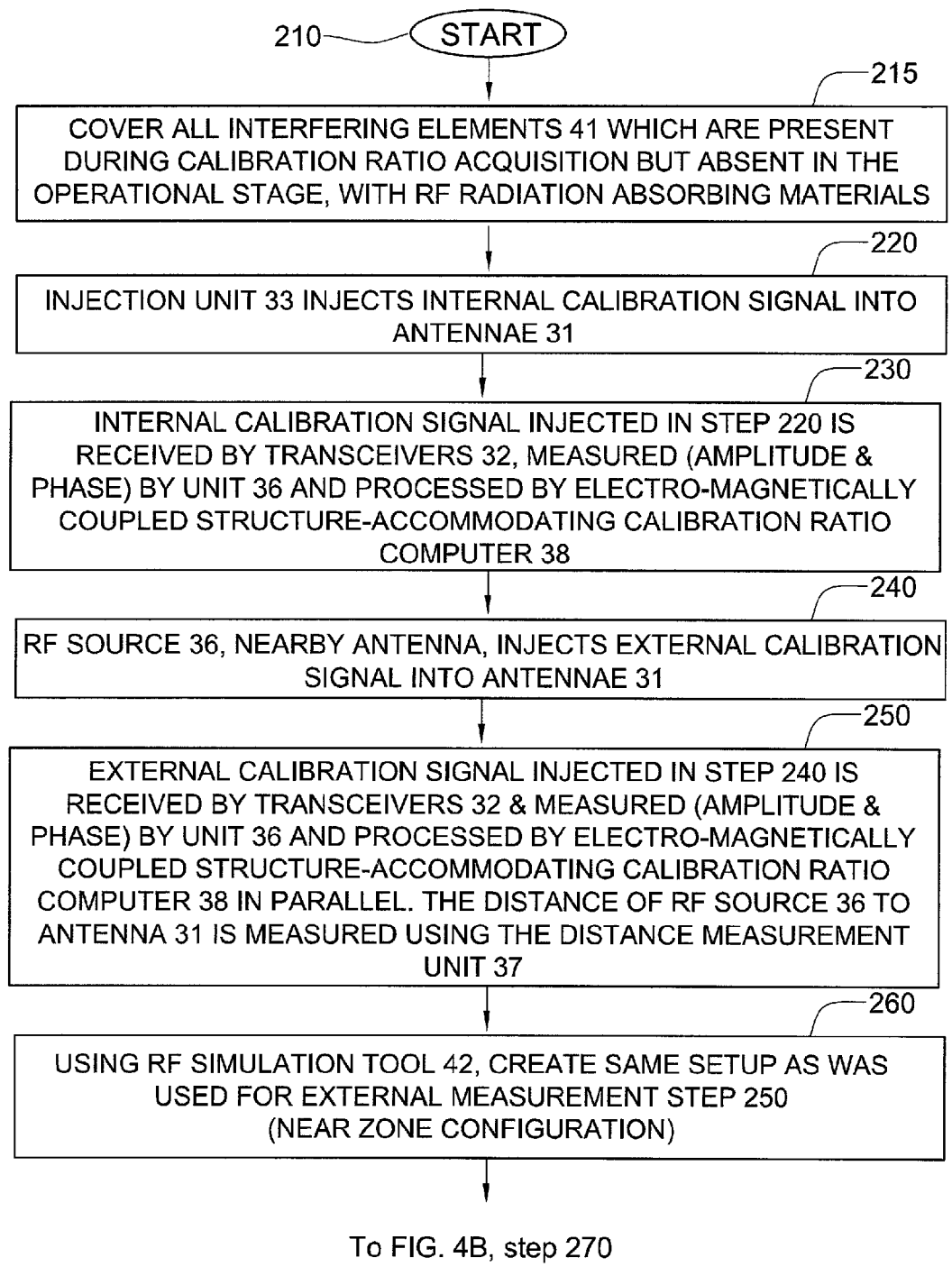
FIGS. 4A-4C, taken together, form a simplified flowchart illustration of an antenna calibration method operative according to certain embodiments of the present invention and including computing a calibration ratio in accordance with the system of FIG. 1.
Figure 4B:
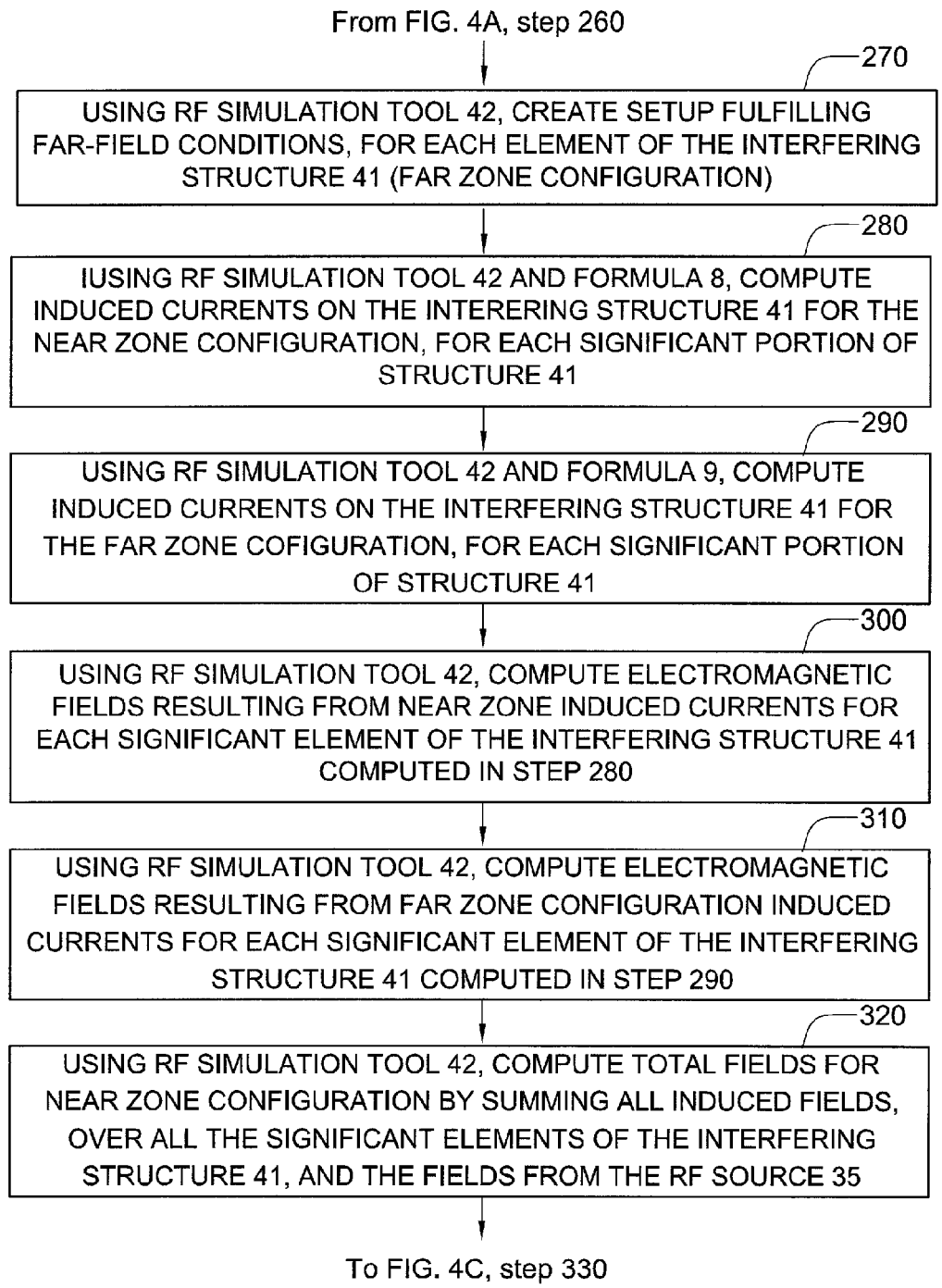
Figure 4C:
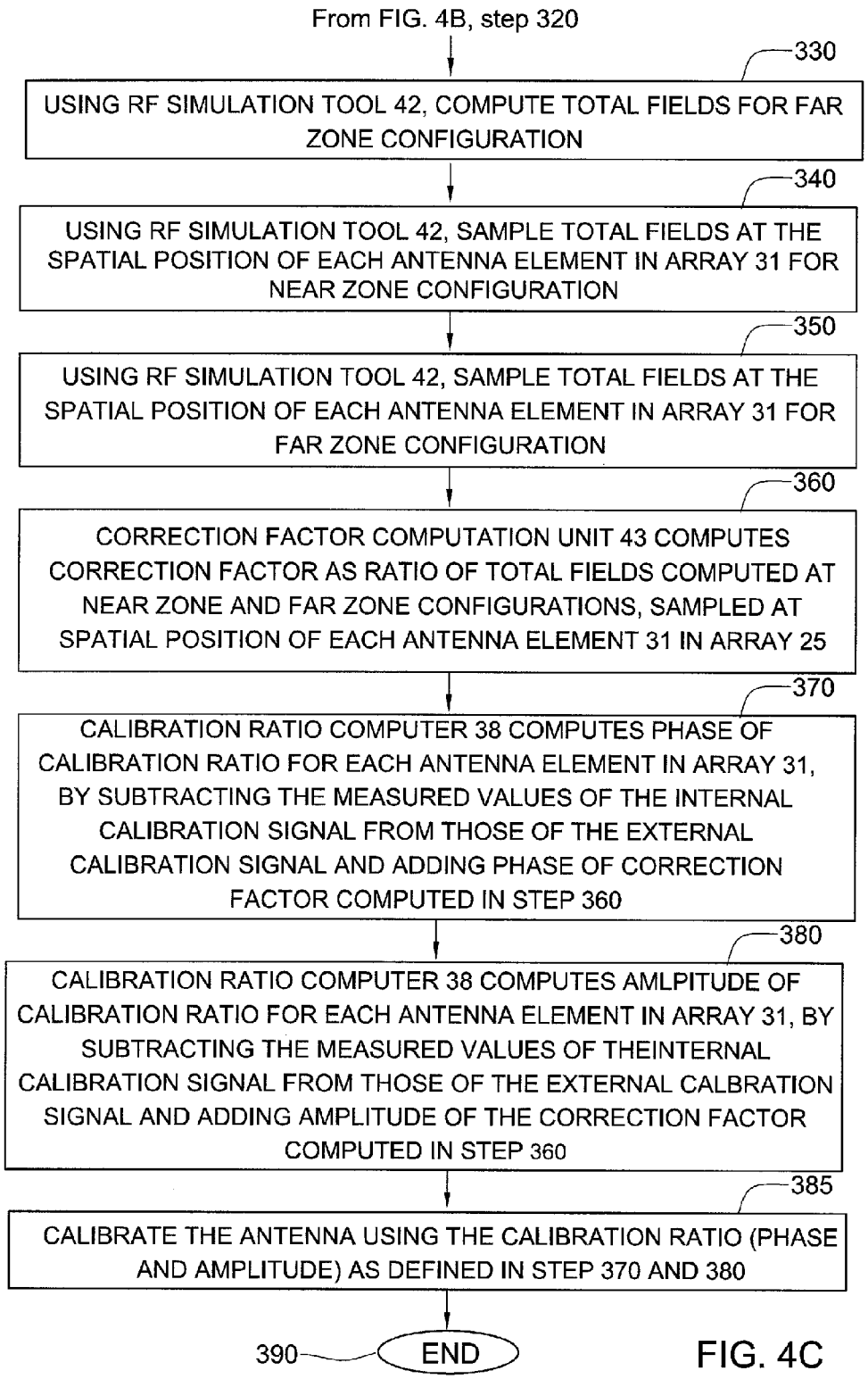

FIGS. 4A-4C, taken together, form a simplified flowchart illustration of an antenna calibration method operative according to certain embodiments of the present invention and including computing a calibration ratio in accordance with the system of FIG. 1.

In Step 220, an internal signal is injected via injection unit 33 to each antenna element. This signal is redirected to the transceivers 32 where it is sampled, processed and finally stored (step 230). This step is repeated for all frequencies needed in the operational phase. The next step is to inject an external signal to the antenna elements (step 240). This is done via the point RF source 35 which is connected by a cable 34 to the injection unit 33 as the antenna array 25 itself. This allows for a perfect synchronization of the signal in its transmit and receive paths. This signal is also sampled, processed and stored (step 250). Due to the high level of synchronization a pulse signal is integrated later on so as to achieve higher SNR in the measurement.

A suitable method for computing a calibration ratio under the assumption that there is no electromagnetic coupling of the antenna to the platform, is now described:

The calibration ratio is determined by the ratio of the following two measured signals:
1) Signal injected by the external point RF source 35 and
2) Internal injected signal $IN^0$ by the auxiliary channels 33.

By definition the calibration ratio ($CR^0$) is given by the following expression:

$$CR^0 = \frac{EX^0}{IN^0} \cdot CF^0 \qquad (2)$$

Where $EX^0$ is the signal injected by the external point RF source 35 measured at the input to the electro-magnetically coupled structure-accommodating calibration ratio computer 38, $IN^0$ is the internal signal as injected via the injection unit 33 measured at the input to the electro-magnetically coupled structure-accommodating calibration ratio computer 38, and $CF^0$ is the correction factor representing the correction for the spherical wave front 40 from the point RF source 35.

The superscript 0 indicates the assumed absence of the interfering body 41.

The phase of the calibration ratio for antenna element n, $\phi_{CR,n}{}^0$, is found by the following formula:

$$\phi_{CR,n}{}^0 = \phi_{EX,n}{}^0 - \phi_{IN,n}{}^0 + \phi_{CF,n}{}^0 \qquad (3)$$

Where $\phi_{EX,n}{}^0$ is the phase of the signal injected by the point RF source 35, as measured by the electro-magnetically coupled structure-accommodating calibration ratio computer 38 for antenna element n, $\phi_{IN,n}{}^0$ is the phase of the internal injected signal $IN^0$, as measured by the electro-magnetically coupled structure-accommodating calibration ratio computer 38 for antenna element n, $\phi_{CF,n}{}^0$ is the phase of the correction factor $CF^0$ for the spherical wave front 40 from the point RF source 35, for each antenna element which is given as:

$$\varphi_{CF,n}^0 = \frac{2\pi}{\lambda}\left[\sqrt{x_q^2 + y_q^2 + z_q^2} - \sqrt{(x_n - x_q)^2 + (y_n - y_q)^2 + (z_n - z_q)^2}\,\right] \qquad (4)$$

The expression in (4) is given in the coordinate system of the antennae array 25 whose origin is marked by O and whose unit vectors $(\hat{x},\hat{y},\hat{z})$ are shown in FIG. 2.

$(x_q,y_q,z_q)$ denotes the position of the point RF source 35 relatively to the center of the antenna array 25, $(x_n,y_n,z_n)$ is the position of antenna element n in antenna array 25, relative to the origin O and $\lambda$ is the wavelength of the radiation.

The amplitude of the calibration ratio for antenna element n, $A_{CR,n}^0$, may be computed by the following formula, (note: all the amplitudes are measured in dB).

$$A_{CR,n}^0 = A_{EX,n}^0 - A_{IN,n}^0 + A_{CF,n}^0 \quad (5)$$

Where $A_{EX,n}^0$ is the measured amplitude of the signal injected by the point RF source 35 for antenna element n, $A_{IN,n}^0$ is the measured amplitude of the internal injected signal $IN^0$ for antenna element n, and $A_{CF,n}^0$ is the amplitude of the correction factor $CF^0$ for the spherical wave front 40 from the point RF source 35. This produces a small contribution to the amplitude at each antenna element, given as:

$$A_{CF,n}^0 = 20 \cdot \log_{10}[\sqrt{x_q^2 + y_q^2 + z_q^2} / \sqrt{(x_n-x_q)^2 + (y_n-y_q)^2 + (z_n-z_q)^2}] \quad (6)$$

It is appreciated, as described below with reference to Formulae 17-20, that the correction of the calibration ratio shown and described herein to accommodate for electromagnetic coupling to platform elements and other interfering elements can be regarded as an extension of a similar situation, described here, in which there is no electromagnetic coupling.

In steps 260 and 270, external signal measurement is simulated; first under the near zone conditions (step 260) and second under the far zone conditions (step 270). This is done using RF simulation tools having a Maxwell's equation solving functionality. In step 260, the distance between the point RF source 35 and the antenna 31 is the same as was used for the external signal measurement step 250 e.g. as illustrated in FIG. 1 (near-zone configuration). This is done again (step 270) at a large distance—the latter representing the far zone conditions of the point RF source 35 and the antenna 31 together with the interfering body 41.

The simulation performed in step 260 and 270 typically relies upon detailed information characterizing the structure and shape of the interfering body 41. Simulation of the injection from a point RF source 35 to the antenna is carried out in both configurations. A difference between these two computations is performed and this difference is added phase wise and amplitude wise (steps 370 & 380) to the measurement done with point RF source 35 at the nearby distance. It is assumed that in simulating the signals at two different distances, only the electro-magnetic coupling to the interfering body 41 is modified. On the other hand, the simulation is not aware of the variation in the antenna element pattern and it assumes the same pattern for all of them. These variations originate in the electro-magnetic coupling between elements and this is the reason why it is not possible to use simulation only. The measurement effected at the nearby distance contains precisely this information and therefore it complements the information that is missing in the simulation. Having the internal injection results and the modified external injection results, the ratio between them as computed in step 360 of FIG. 4C is used to define the phase and amplitude of the modified calibration ratio.

The formula used for calibration ratio computation, e.g. formula 2 above, may be generalized to include the total effects of the interfering body 41 and the correction for the spherical wave front 40 from the point RF source 35 as follows:

$$CR = \frac{EX}{IN} \cdot CF \quad (7)$$

Where EX is the signal injected by the external point RF source 35 measured at the input to the electro-magnetically coupled structure-accommodating calibration ratio computer 38 (including the interfering body effect), IN is the internal signal as injected via the injection unit 33 measured at the input to the electro-magnetically coupled structure-accommodating calibration ratio computer 38 (including the interfering body effect), and CF is the correction factor, computed by unit 43 in FIG. 1 and including corrections due to the effects, on the electromagnetic coupling ratio, of interfering body 41 and the correction for the spherical wave front 40 from the point RF source effect.

Steps 280 and 290: The induced currents on the interfering body 41, resulting from the point RF source 35, are computed:

$$F_{NF}^S \rightarrow I_{NF}^i \quad (8)$$

$$F_{FF}^S \rightarrow I_{FF}^i \quad (9)$$

Where the fields generated on the interfering body 41, $F_{NF}^S$ and $F_{FF}^S$, represent the electromagnetic fields emitted from the point RF source 35 at the near by distance and the far zone configuration respectively, and $I_{NF}^i$, $I_{FF}^i$ represent the induced currents resulting form the point RF source 35 field at the nearby distance and the far zone configuration, respectively.

The superscript i is the index for the i-th element of the interfering body 41 i.e. a wing, an engine, and so forth.

Induced currents are computed both for the setup at the near by distance (in step 280—e.g. using formula 8) and (in step 290—e.g. using formula 9) using the setup that fulfills the far zone requirement for the combined structure of the antenna together with the interfering body 41. These computations are carried out separately for each significantly electro-magnetically coupled portion of the interfering body 41. For example, in the case illustrated in FIG. 5, the significant portions may be a fuselage 543, a wing 544, an engine 545, a stabilizer 546 and a rudder 547.

Optionally, higher order effects in the induced currents computations can be included to account for multiple bouncing of the radiation between the interfering parts and the antenna elements and among the different interfering parts themselves.

Steps 300 and 310: The resulting electromagnetic fields, due to the induced currents, are computed for each element of the interfering body 41.

$$I_{NF}^i \rightarrow F_{NF}^i \quad (10)$$

$$I_{FF}^i \rightarrow F_{FF}^i \quad (11)$$

Where the fields $F_{NF}^i$ and $F_{FF}^i$, represent the electromagnetic fields, resulting from the induced currents, for point RF source 35 at the nearby distance and the far zone configuration, respectively, for the i-th element of the interfering body 41.

The above computation of fields is effected both for the setup at the near-zone configuration (step 300—formula 10) and for the far-zone configuration (step 310—formula 11).

Steps 320 and 330: The total field is computed by summing all the induced fields, for all the elements of the interfering body 41 and the fields emitted from the point RF source 35. This is done once for the setup at the near-zone configuration, in step 320. The second computation is made at the far-zone configuration (step 330).

$$F_{NF}^T = \sum_i F_{NF}^i + F_{NF}^S \quad (12)$$

$$F_{FF}^T = \sum_i F_{FF}^i + F_{FF}^S \quad (13)$$

Here, the fields include:

$F_{NF}^S$ and $F_{FF}^S$ represent the source electromagnetic fields at the near by distance and the far zone configuration respectively, $F_{NF}^I$ and $F_{FF}^I$ represent the induced electromagnetic fields at the nearby distance and the far zone configuration respectively and $F_{NF}^T$ and $F_{FF}^T$ represent the total electromagnetic fields at the nearby distance and the far zone configuration respectively.

Steps 340 and 350: The resulting electromagnetic total fields are then sampled at the spatial position of each antenna element. This is done for the near-zone configurations (step 340) and for the far-zone configuration (step 350).

Finally (step 360), the correction factor CF for each antenna element 31 is computed (formula 14) as the ratio of the total fields computed at the near by distance and the far zone configuration, sampled at the spatial position of each antenna element 31 in antenna array 25:

$$CF_n = [F_{FF}^T]_n / [F_{NF}^T]_n \quad (14)$$

Where $CF_n$ is the correction factor for the calibration ratio for antenna element n, and the square brackets $[\cdot]_n$ stands for the sampled fields at the spatial position of antenna element n.

Step 370: The phase of the calibration ratio for antenna element n, $\phi_{CR,n}$, is then computed e.g. using the following formula:

$$\phi_{CR,n} = \phi_{EX,n} - \phi_{IN,n} + \phi_{CF,n} \quad (15)$$

Where $\phi_{EX,n}$ is the phase of the signal injected by the point RF source 35, as measured by the electro-magnetically coupled structure-accommodating calibration ratio computer 38 for antenna element n in array 31, $\phi_{IN,n}$ is the phase of the internal injected signal $IN^0$, as measured by the electro-magnetically coupled structure-accommodating calibration ratio computer 38 for antenna element n, and $\phi_{CF,n}$ is the phase of the correction factor $CF^0$ as computed in step 360, using formula 14.

Step 380: The amplitude, $A_{CR,n}$, of the calibration ratio for antenna element n is computed by the following formula:

$$A_{CR,n} = A_{EX,n} - A_{IN,n} + A_{CF,n} \quad (16)$$

Where $A_{EX,n}$ is the amplitude of the signal injected by the point RF source 35 as measured by the electro-magnetically coupled structure-accommodating calibration ratio computer 38 for antenna element n, $A_{IN,n}$ is the amplitude of the internal injected signal $IN^0$ as measured by the coupled structure-accommodating calibration ratio computer 38 for antenna element n, and $A_{CF,n}$ is the amplitude of the correction for the calibration-ratio as computed using formula 14.

It is appreciated that, in the absence of any interfering body 41, the correction for the calibration ratio computed in step 360 using formula 14, takes the form of $[F_{FF}^S]_n/[F_{NF}^S]_n$. This is equal to the differences in the calibration ratio resulting from the correction for the spherical wave front 40 from the point RF source 35 only, namely $CF^0$.

As described below with reference to formula 17-20, it is possible to compute a calibration ratio as a result of the electro-magnetic coupling between the antenna and its platform, by decomposing the correction factor into two contributions one of them being the non electro-magnetically coupled component and the other one being the correction component due to the electro-magnetic coupling.

Writing CF as a product $CF = CF^0 \cdot CF^1$, formula 7, yields:

$$CR = \frac{EX}{IN} \cdot CF^0 \cdot CF^1 \quad (17)$$

Where $CF^1$ is the transfer function of all corrections due to the interfering body effects without the effects of correction for the spherical wave front 40 from the point RF source 35.

The correction for the calibration-ratio in this case, for the effects, on the electro-magnetic coupling ratio, of interfering body 41 only, may be computed as a ratio:

$$CF_n^1 = \frac{[F_{FF}^T]_n}{[F_{FF}^S]_n} / \frac{[F_{NF}^T]_n}{[F_{NF}^S]_n} = \left(\frac{\left[\sum_i F_{FF}^i\right]_n}{[F_{FF}^S]_n} + 1\right) / \left(\frac{\left[\sum_i F_{FF}^i\right]_n}{[F_{FF}^S]_n} + 1\right) \quad (18)$$

This yields the following formula for the phase of the calibration ratio:

$$\phi_{CR,n} = \phi_{CR,n}^0 + \phi_{CF,n}^1 \quad (19)$$

Where $\phi_{CF,n}^1$ is the phase of the correction for the calibration-ratio, for the interfering body effects only, as computed from formula 18.

The formula for the amplitude of the calibration ratio may be determined by the following:

$$A_{CR,n} = A_{CR,n}^0 + A_{CF,n}^1 \quad (20)$$

Where $A_{CF,n}^1$ is the amplitude of the correction for the calibration-ratio, for the effects, on the electro-magnetic coupling ratio, of interfering body 41 only, as computed from formula 18.

FIGS. 5-7 illustrate three examples of the main structural elements of certain platforms supporting certain antenna installations which may be calibrated in accordance with certain embodiments of the present invention.

FIG. 5 is an illustration of a conformal antenna 542 installed on an aircraft, with external point RF source 541. The interfering portions (steps 280 and 290 being performed separately for each) for this case are: the fuselage 543, the wing 544, the engine 545, the stabilizer 546 and the rudder 547. FIG. 6 is an illustration of an array of four antennas 552 installed on a boat, with external point RF source 551. The interfering portions (steps 280 and 290 being performed separately for each) for this case are: the hull 553, the two masts 554 and 555 and the bridge 556. FIG. 7 is an illustration of an antenna installed on a tank 562, with external point RF source 561. The interfering portions (steps 280 and 290 being performed separately for each) for this case are: the hull 563, the turret 564 and the cannon 565.

RF source 35 need not necessarily comprise a point source or source with a well defined phase center. In this case the measured pattern of this source replaces the pattern of the point RF source in the RF simulation tools, for all the computations shown and described herein. The calibration ratio is then determined according to formula 7 as opposed to formula 17 which is specific for spherical sources. The resulting correction factor ($CF^o$) compensates the effects, on the electro-magnetic coupling ratio, of interfering body 41 and the effects added due to the pattern of the RF source 35.

Figure 8:
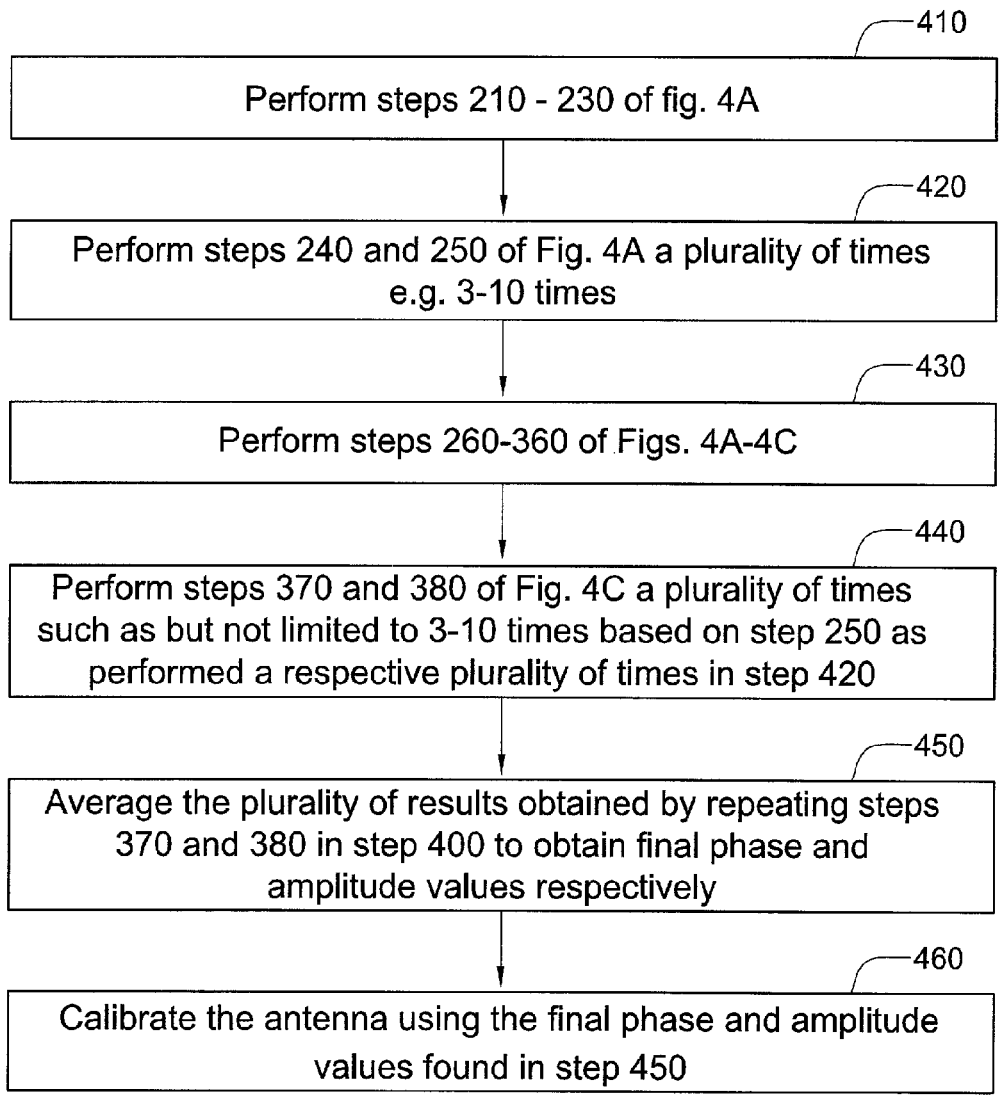
FIG. 8 is a simplified flowchart illustration of an antenna calibration method which is similar to the method of FIGS. 4A-4C but is particularly suited for reducing white noise effects.

FIG. 8 is a simplified flowchart illustration of an antenna calibration method which is similar to the method of FIGS. 4A-4C but is particularly suited for reducing white noise effects. The method of FIG. 8 typically includes some or all of the following steps, suitably ordered e.g. as shown:

Step 410: perform steps 210-230 of FIG. 4A

Step 420: perform steps 240 and 250 of FIG. 1 a plurality of times e.g. 3-10 times.

Step 430: perform steps 260-360 of FIGS. 4A-4C

Step 440: perform steps 370 and 380 a plurality of times such as but not limited to 3-10 times based on step 250 as performed a respective plurality of times in step 420

Step 450: average the plurality of results obtained by repeating steps 370 and 380 in step 440 to obtain final phase and amplitude values respectively Step 460: calibrate the antenna using the final phase and amplitude values found in step 450

Figure 9:
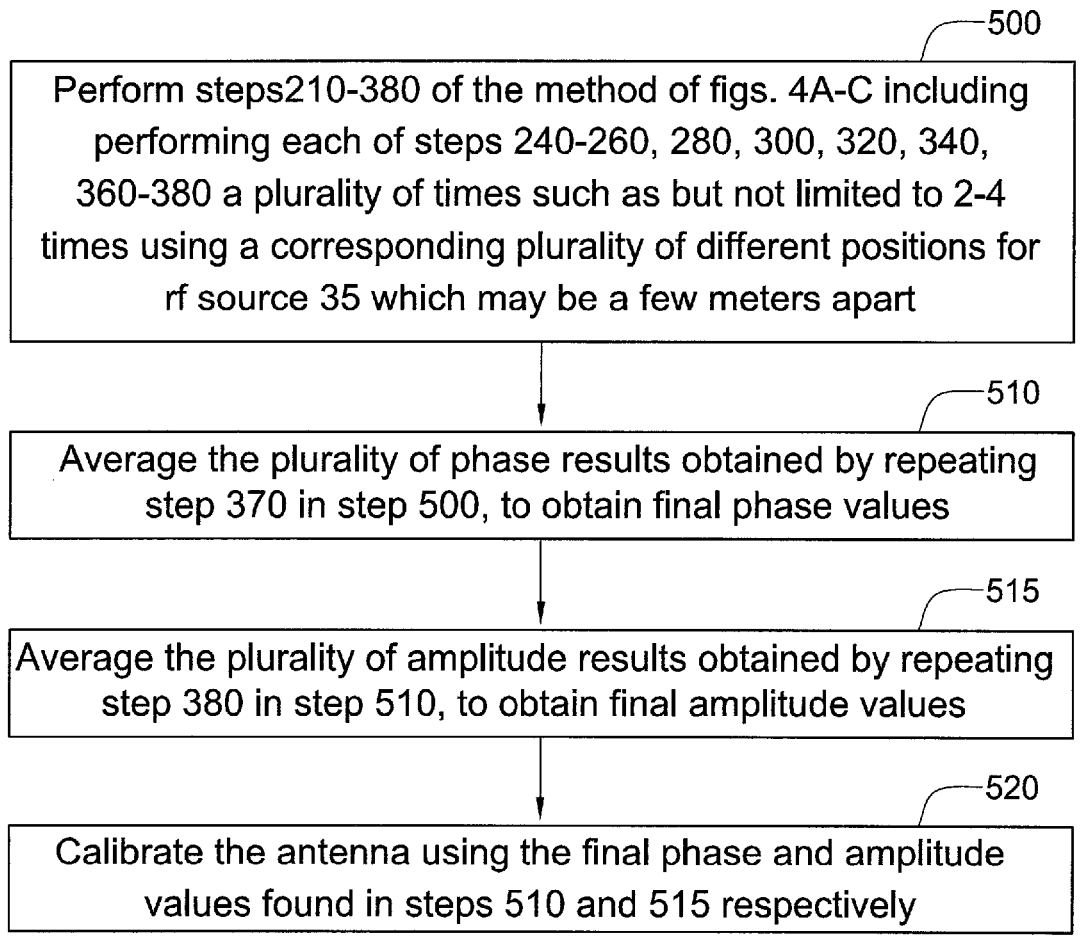
FIG. 9 is a simplified flowchart illustration of an antenna calibration method which is similar to the method of FIGS. 4A-4C but is particularly suited for reducing artifactual noise effects due to interfering physical objects which may continue to provide a certain degree of residual interference even if covered.
Figure 10:
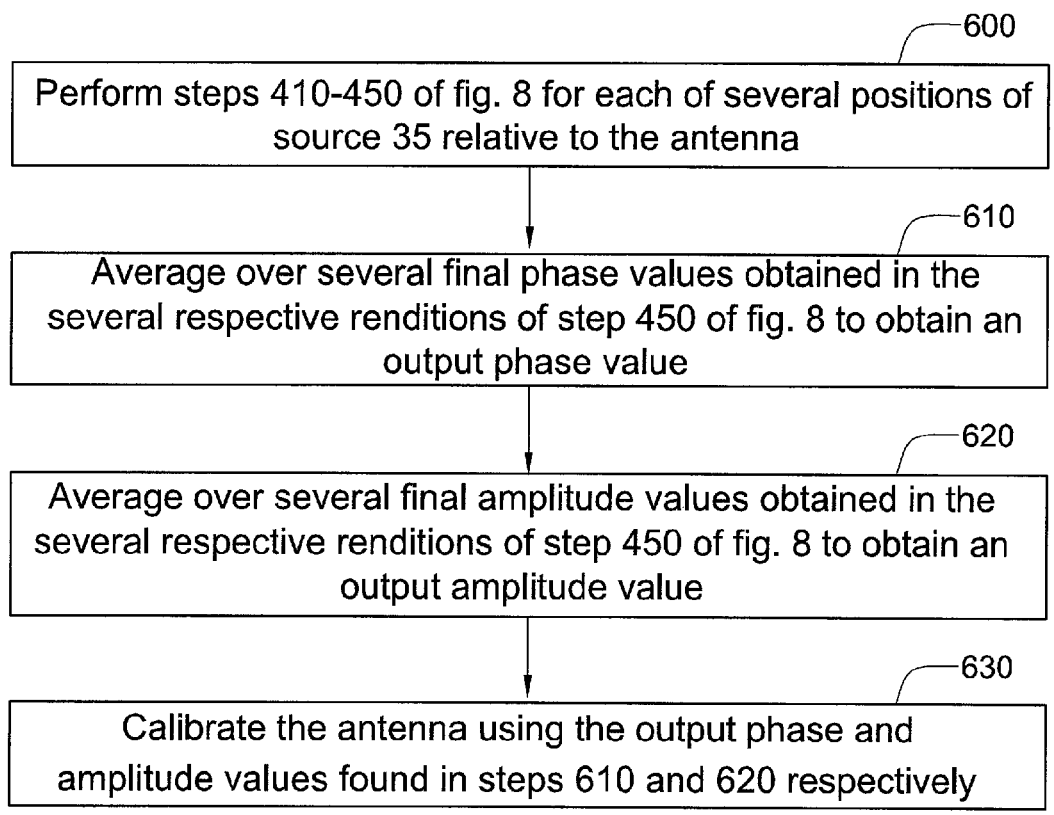
FIG. 10 is a simplified flowchart illustration of an antenna calibration method which is similar to the method of FIGS. 4A-4C but is particularly suited for reducing white noise effects and for reducing artifactual noise effects due to interfering physical objects which may continue to provide a certain degree of residual interference even if covered.

FIG. 9 is a simplified flowchart illustration of an antenna calibration method which is similar to the method of FIGS. 4A-4C but is particularly suited for reducing artifactual noise effects due to interfering physical objects which may continue to provide a certain degree of residual interference even if covered. The method of FIG. 9 typically includes some or all of the following steps, suitably ordered e.g. as shown:

Step 500: perform steps 210-380 of the method of FIGS. 4A-4C including performing each of steps 240-260, 280, 300, 320, 340, 360-380 a plurality of times such as but not limited to 2-4 times using a corresponding plurality of different positions for RF source 35 which may be a few meters apart Step 510: average the plurality of phase results obtained by repeating step 370 in step 500, to obtain final phase values Step 515: average the plurality of amplitude results obtained by repeating step 380 in step 510, to obtain final amplitude values Step 520: calibrate the antenna using the final phase and amplitude values found in steps 510 and 515 respectively FIG. 10 is a simplified flowchart illustration of an antenna calibration method which is similar to the method of FIG. 4A-4C but is particularly suited for reducing white noise effects and for reducing artifactual noise effects due to interfering physical objects which may continue to provide a certain degree of residual interference even if covered. Typically, plural calibration ratios may be computed as per any of the embodiments of the present invention respective plural times for a first position of source 35 relative to the antenna, then the source 35 may be moved and again, plural calibration ratios may be computed as per any of the embodiments of the present invention respective plural times, whereas the final calibration ratio is obtained by averaging each of phase and amplitude as obtained over the various positions and over the plural computations.

The method of FIG. 10 typically includes some or all of the following steps, suitably ordered e.g. as shown:

Step 600: perform steps 410-450 of FIG. 8 for each of several positions of source 35 relative to the antenna Step 610: average over several final phase values obtained in the several respective renditions of step 450 of FIG. 8 to obtain an output phase value Step 620: average over several final amplitude values obtained in the several respective renditions of step 450 of FIG. 8 to obtain an output amplitude value Step 630: calibrate the antenna using the output phase and amplitude values found in steps 610 and 620 respectively.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery.

The invention claimed is:

1. A system for calibration of a phased array antenna having a network of auxiliary channels internally injecting internal signals to the antenna, to be used in an environment including at least one interfering member affecting a calibration ratio of the antenna, the antenna comprising a plurality of mutually electro-magnetically coupled antenna elements, the system comprising:
an RF source external to the antenna, operative to project external signals toward the antenna when disposed at a near-by distance therefrom;
an RF simulation unit operative to generate simulated first electro-magnetic coupling-zero far-zone external fields projected toward the antenna from an RF source located at a far-zone distance from the antenna, assuming that first electro-magnetic coupling between the mutually electro-magnetically coupled antenna elements to be zero, and also operative to generate simulated first electro-magnetic coupling-zero near zone external fields projected toward the antenna from an RF source located at said near-by distance from the antenna were the first electro-magnetic coupling between said mutually electro-magnetically coupled antenna elements to be zero; and
a electro-magnetically coupled structure-accommodating calibration ratio computer operative to compute a Modified Calibration ratio by combining an indication of said internal signals and said external signals as received by the antenna, with a correction factor based on an output of said RF simulation unit.

2. A system according to claim 1 wherein said RF source comprises an RF point source.

3. A system according to claim 1 wherein said RF source is spherical.

4. A system according to claim 1 wherein said RF source is non-spherical.

5. A system according to claim 1 wherein said antenna calibrator is operative to combine said calibration ratio and said correction factor by adding the phases of the calibration ratio and said correction factor to obtain a phase value of the Modified Calibration ratio and adding decibel representations of the amplitudes of the calibration ratio and said correction factor to obtain a decibel representation of an amplitude of the Modified Calibration ratio.

6. A system according to claim 1 wherein said RF simulation tool computes the correction factor by computing electromagnetic fields generated in and propagating within a non-continuous medium.

7. A system according to claim 1 wherein said antenna comprises a cellular antenna.

8. A system according to claim 1 and also comprising a platform upon which the antenna is mounted and wherein said interfering member is part of said platform.

9. A system according to claim 1 wherein said signal measurement and recording device measures amplitude and phase of the samples of said internal and external signals.

10. A system according to claim 1 wherein the external signals are affected by first electro-magnetic coupling between the plurality of mutually electro-magnetically coupled antenna elements and by second electro-magnetic coupling between the source and the interfering member,
the system also comprising:
a signal measuring and recording device measuring and recording samples of the internal signals and said external signals; and
a correction factor computation unit operative to compute a correction factor for the calibration ratio which factor corrects for presence of the interfering member and has a phase and an amplitude, by comparing said simulated first electro-magnetic coupling-zero far-zone external electromagnetic fields and said simulated first electro-magnetic coupling-zero near zone external electromagnetic fields,
and wherein said electro-magnetically coupled structure-accommodating calibration ratio computer is operative to compute the modified Calibration ratio by combining the ratio of said internal and external signals as received by the antenna with said correction factor.

11. A system according to claim 1 and also comprising an internal injection network synchronized with the transceivers and operative for internally injecting internal signals to the antenna.

12. A method for calibrating an antenna comprising a phased array of antenna elements connected to plurality of transceivers, the method comprising:
providing an RF source of externally injected signals operative when located close to the antenna to be synchronized with the transceivers;
determining, per antenna element, a calibration ratio adapted to accommodate for presence of at least one interfering structure electromagnetically interfering with a signal transmitted from said RF source and received by the antenna; and
calibrating the antenna using the per-antenna element calibration ratios adapted to accommodate for presence of at least one interfering structure.

13. A method according to claim 12 wherein said determining includes:
generating simulated far field and near field signals so as to simulate a signal transmitted by an RF source located at infinity and located near the RF source respectively;
internally injecting an internal signal into the antenna via an internal injection network synchronized with the transceivers, wherein said interfering structure interferes with said internal signal;
using said RF source to externally inject an external signal into the antenna; and
for each individual antenna element, computing said calibration ratio by combining information characterizing said internal and external signals as received by said individual antenna element with a correction factor characterizing said simulated far field and near field signals and representing, per antenna element, the ratio of said simulated far field and near field signals.

14. A method according to claim 12 wherein at least one physical object which is electromagnetically coupled to radiation emitted by the RF source thereby to define unwanted radiation in context of said calibration, is present in the course of said determining and calibrating and is absent in a subsequent operational stage, the method also comprising screening said unwanted radiation.

15. A method according to claim 14 wherein said screening comprises covering said at least one physical object with RF-radiation absorbing material.

16. A method according to claim 15 wherein said determining and calibrating occurs on the ground, said operational stage is airborne and said physical object is fixed to the ground.

17. A method according to claim 12 wherein said determining comprises determining the calibration ratio a plurality of times thereby to obtain a plurality of interim calibration ratio results and averaging said plurality of interim calibration ratio results to obtain said calibration ratio adapted to accommodate for presence of at least one interfering structure.

18. A method according to claim 17 wherein said determining the calibration ratio a plurality of times includes re-positioning said RF source a plurality of times, thereby to compensate for artifactual noise generated by said at least one interfering structure during calibration ratio measurement.

19. A method according to claim 17 wherein said calibration ratio is determined a plurality of times for a single position of said RF source, thereby to compensate for white noise during calibration ratio measurement.

20. A method according to claim 12 wherein said correction factor includes a phase and an amplitude and wherein said at least one interfering structure comprises a plurality of interfering structures and wherein generating at least one simulated signal comprises performing the following operations for a near field configuration and for a far field configuration:
   a. computing a plurality of simulated first electromagnetic fields generated at the plurality of interfering structures respectively due to radiation emitted by the RF source;
   b. computing a plurality of simulated induced currents generated at the plurality of interfering structures respectively due to radiation emitted by the RF source;
   c. for each antenna element in the phased array of antenna elements:
      1. simulating a second electromagnetic field generated at the antenna element due to radiation emitted by the RF source;
      2. computing a plurality of simulated third electromagnetic fields generated at the antenna element due to said plurality of simulated induced currents respectively; and
      3. generating a total field by summing said plurality of simulated third electromagnetic fields and said second electromagnetic field;
   d. for each antenna element in the phased array of antenna elements:
      1. computing a correction factor by computing a ratio of the total field as computed for the far field configuration divided by the total field as computed for the near field configuration; and
      2. computing said phase and amplitude of said calibration ratio by measuring phase and amplitude for each of said internal and external signals as received by each of said antenna elements; and
   e. for each individual antenna element, computing said calibration ratio adapted to accommodate for presence of at least one interfering structure by computing a difference between said phases of said external and internal signals as received by said individual antenna element, and adding the phase of the correction factor.

21. A method according to claim 20 wherein said antenna is installed on an aircraft and said plurality of interfering structures include a fuselage, a first wing, a second wing, an engine, a stabilizer and a rudder.

22. A method according to claim 20 wherein said antenna is installed on an ship and said plurality of interfering structures include a hull, at least one mast and a bridge.

23. A method according to claim 20 wherein said antenna is installed on a tank and said plurality of interfering structures include a hull, a turret and a cannon.

24. A method according to claim 20 and also comprising computing (in dB) a difference between said amplitudes of said external and internal signals as received by said individual antenna element, and adding the amplitude (in DB) of the correction factor.

25. A method according to claim 12 wherein said method is carried out in field conditions in which no anechoic chamber is available.

26. A computer program product, comprising a computer readable storage medium having a computer readable program code embodied therein, said computer readable program code adapted to be executed to implement a method for calibrating an antenna comprising a phased array of antenna elements connected to plurality of transceivers, the method comprising:
   providing an RF source located operative when located close to the antenna to be synchronized with the transceivers;
   determining, per antenna element, a calibration ratio adapted to accommodate for presence of at least one interfering structure electromagnetically interfering with a signal transmitted from an RF source, which is located close to the antenna and synchronized with the transceivers, the signal being received by the antenna, wherein said determining includes:
   generating simulated far field and near field signals so as to simulate a signal transmitted by an RF source located at infinity and located near the RF source respectively;
   internally injecting an internal signal into the antenna via an internal injection network;
   using said RF source to externally inject an external signal into the antenna; and
   for each individual antenna element, computing said calibration ratio by combining information characterizing said internal and external signals as received by said individual antenna element with a correction factor characterizing said simulated far field and near field signals; and
   calibrating the antenna using the per-antenna element calibration ratios adapted to accommodate for presence of at least one interfering structure.

* * * * *